(12) United States Patent
Haddix et al.

(10) Patent No.: US 10,940,526 B2
(45) Date of Patent: Mar. 9, 2021

(54) RIVET TAPE MENDING PROCESS AND SYSTEM

(71) Applicant: FORD MOTOR COMPANY, Dearborn, MI (US)

(72) Inventors: Kevin Leon Haddix, Dundee, MI (US); Michael Poniewierski, Howell, MI (US); William Kenneth Vincent, Fenton, MI (US); Michael R. Polarolo, Shelby Township, MI (US)

(73) Assignee: Ford Motor Company, Dearborn, MI (US)

( * ) Notice: Subject to any disclaimer, the term of this patent is extended or adjusted under 35 U.S.C. 154(b) by 134 days.

(21) Appl. No.: 16/179,121

(22) Filed: Nov. 2, 2018

(65) Prior Publication Data

US 2019/0070658 A1    Mar. 7, 2019

Related U.S. Application Data

(62) Division of application No. 15/070,903, filed on Mar. 15, 2016, now Pat. No. 10,150,155.

(51) Int. Cl.
*B21J 15/38* (2006.01)
*B23P 6/00* (2006.01)
*B21J 15/32* (2006.01)
*B26D 1/08* (2006.01)
(Continued)

(52) U.S. Cl.
CPC ............. *B21J 15/38* (2013.01); *B21J 15/323* (2013.01); *B23P 6/00* (2013.01); *B26D 1/085* (2013.01); *B29C 65/5042* (2013.01); *B29C 66/12842* (2013.01); *B29C 66/41* (2013.01)

(58) Field of Classification Search
CPC ......... B21J 15/38; B21J 15/323; B26D 1/085; B23P 6/00
See application file for complete search history.

(56) References Cited

U.S. PATENT DOCUMENTS

| 2,318,287 | A | * | 5/1943 | Brolin | G03D 15/043 403/265 |
| 4,368,096 | A | * | 1/1983 | Kobayashi | G03D 13/005 156/159 |
| 5,078,828 | A | * | 1/1992 | Marglin | G03D 15/043 156/304.1 |

OTHER PUBLICATIONS

Non Final Office Action dated Feb. 5, 2018 for U.S. Appl. No. 15/070,903, filed Mar. 15, 2016.
(Continued)

*Primary Examiner* — Jun S Yoo
(74) *Attorney, Agent, or Firm* — Vincent Mastrogiacomo; King & Schickli, PLLC (57) ABSTRACT

A method for repairing rivet tape includes steps of cutting portions of the rivet tape on each side of a break to define at least three aligned coplanar rivet tape edges, abutting the at least three aligned coplanar rivet tape edges to define a seam, and joining the at least three aligned coplanar rivet tape edges to one another. The seam may define a Z shape. One or more rivets may be removed to expose rivet apertures on each side of the break before the steps of cutting, abutting, and joining. The step of joining is accomplished by at least one adhesive strip disposed on a surface of the rivet tape and dimensioned to overlie the at least one or more exposed rivet apertures. Adhesive strips may be disposed on each opposed surface of the rivet tape length. In other aspects, workstations comprise devices for practicing the described methods.

16 Claims, 6 Drawing Sheets

(51) Int. Cl.
*B29C 65/50* (2006.01)
*B29C 65/00* (2006.01)

(56) References Cited

OTHER PUBLICATIONS

Final Office Action dated May 30, 2018 for U.S. Appl. No. 15/070,903, filed Mar. 15, 2016.

* cited by examiner

RIVET TAPE MENDING PROCESS AND SYSTEM

This is a divisional patent application claiming priority to U.S. patent application Ser. No. 15/070,903 filed on Mar. 15, 2016, the entirety of the disclosure of which is incorporated herein by reference.

TECHNICAL FIELD

This disclosure relates generally to rivet tapes. More particularly, the disclosure relates to systems and processes for repairing a rivet tape section.

BACKGROUND

Various industries utilize rivet tape as a convenient method of storing, holding, and dispensing rivets during manufacturing/assembly joinery processes. As is known, rivet tape is an elongated length of a polymer including spaced-apart apertures defined through a thickness thereof, dimensioned to hold multiple rivets in a spaced apart relationship. Industrial rivet tape also typically includes a plurality of gear indexer apertures along a longitudinal length thereof, to allow feeding the tape and rivets through a suitable riveting machine including indexing gears which advance the rivet tape forwardly through the machine. Conveniently, such riveting machines are configured to hold and to feed a roll of rivet tape and associated rivets therethrough over a workpiece such as adjoining panels to be joined by riveting.

If a portion of a roll of rivet tape is broken or damaged, the damaged portion must be repaired in order for the roll to properly feed through the riveting machine mechanism. Conventional methods for repairing polymers such as sonic welding are unsuitable because oils in the rivet tape polymer interfere with proper bonding. Conventional adhesives such as glues and epoxies lack sufficient strength to support the stresses imposed by a riveting machine, and adhering polymer strips over a broken or damaged portion using conventional adhesives prevents the repaired rivet tape portion from feeding properly through a riveting machine gearing due to interference from the adhered polymer strips. Conventional tape joints likewise interfere with proper operation of a riveting machine due to problems feeding through the riveting machine indexing gears.

Such broken rivet tapes result in significant waste and economic loss due to inability to effectively use portions of a roll, typically requiring discarding the partial roll and remaining rivets held thereby. Accordingly, a need in the art for a better method for repairing rivet tape is identified.

SUMMARY

To solve the foregoing and other problems, methods and devices for repairing rivet tape are disclosed. In one aspect a method for repairing a break in a rivet tape length is described, comprising cutting portions of the rivet tape length on each side of the break to define at least three aligned coplanar rivet tape edges. Next, the at least three aligned coplanar rivet tape edges are placed in an abutted orientation to define a substantially continuous seam. Finally, the at least three aligned coplanar rivet tape edges are joined to one another.

In embodiments, the substantially continuous seam defines a Z shape. In embodiments, the methods further include removing one or more rivets held in the rivet tape length to expose one or more corresponding rivet apertures on each side of the break before the steps of cutting, abutting, and joining. In particular embodiments from three to six rivets may be removed, typically with equal numbers of rivets being removed from portions of the rivet tape length to either side of the break.

The step of joining is accomplished by disposing at least one adhesive strip on a surface of the rivet tape length, the adhesive strip being dimensioned to overlie at least the at least one or more exposed rivet apertures. In embodiments, a pair of adhesive strips are disposed on opposed surfaces of the rivet tape length and dimensioned to overlie the at least one or more exposed rivet apertures. In embodiments, the at least one adhesive strip is disposed and dimensioned to also overlie a plurality of gear indexer apertures defined in the rivet tape length.

In another aspect, a rivet tape repair workstation is described, including a cutting station comprising a rivet tape holder and a cutter comprising one or more cutting blades configured to cut a rivet tape length whereby at least three aligned coplanar rivet tape edges are defined. The workstation further includes a taping station comprising a plurality of clamps for holding adjoining rivet tape lengths in an abutted relationship. The rivet tape holder may be configured for sliding translation along a track.

In embodiments, the rivet tape holder comprises a slot dimensioned for receiving and holding a length of rivet tape therein. The rivet tape holder may comprise one or more pins dimensioned for engaging corresponding rivet apertures defined in the length of rivet tape. In embodiments, the cutter comprises a blade holder configured for slidingly translating the one or more cutting blades upwardly and downwardly. The workstation may further include a pair of rods configured for slidingly holding a pair of spools on opposed sides of the workstation.

In yet another aspect, method for repairing a break in a rivet tape length using the described rivet tape repair workstation is described.

In the following description, there are shown and described embodiments of the disclosed methods and devices for repairing rivet tape. As it should be realized, the methods and devices are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed methods and devices for repairing rivet tape and together with the description serve to explain certain principles thereof. In the drawings.

Reference will now be made in detail to embodiments of the disclosed methods and devices for repairing rivet tape, examples of which are illustrated in the accompanying drawing figures.

DETAILED DESCRIPTION

Figure 1A:
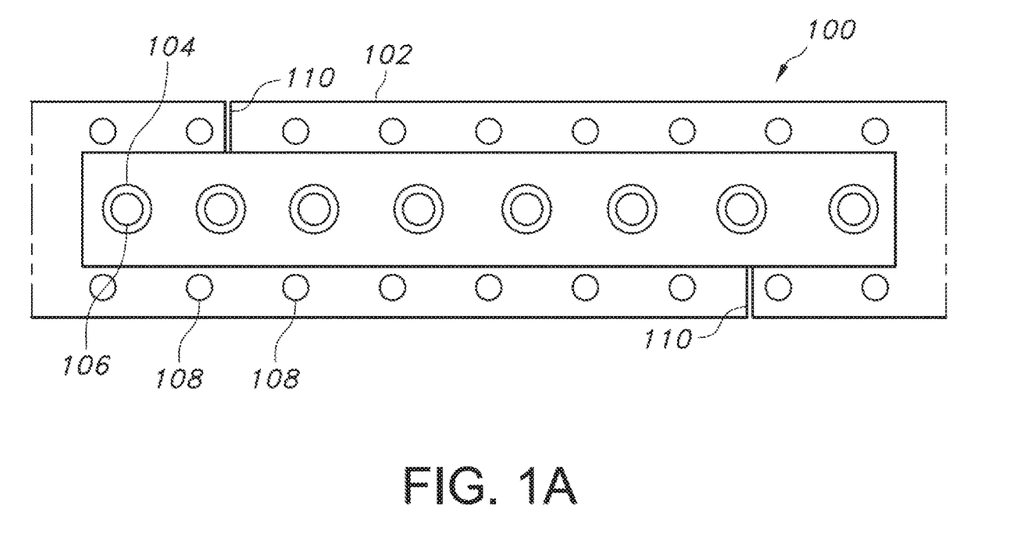
FIG. 1A depicts a length of rivet tape including a single break.
Figure 1B:
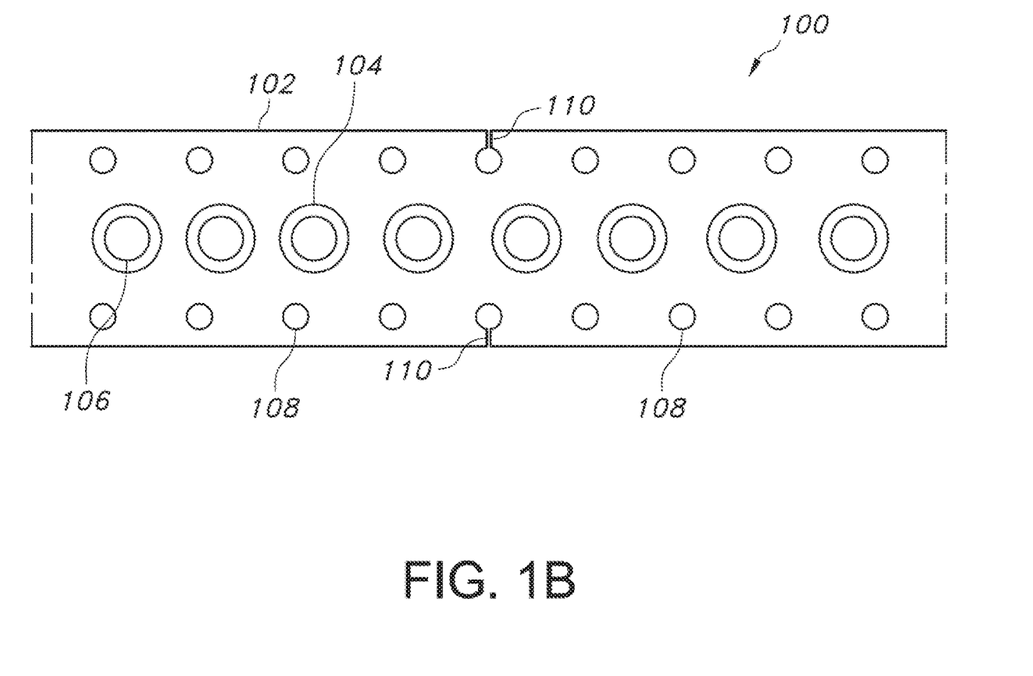
FIG. 1B depicts a length of rivet tape including several breaks.
Figure 2A:
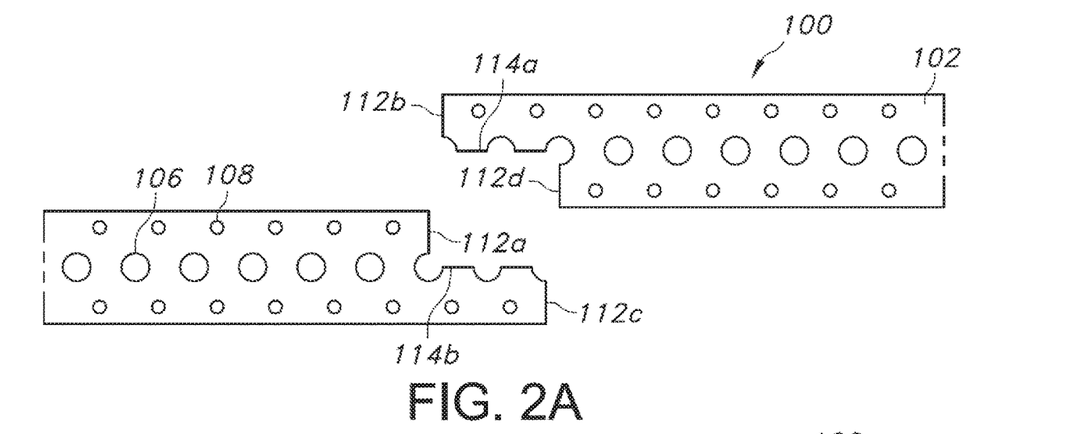
FIG. 2A depicts a transverse cut made in a length of rivet tape to practice a method for mending rivet tape according to the present disclosure.
Figure 2B:
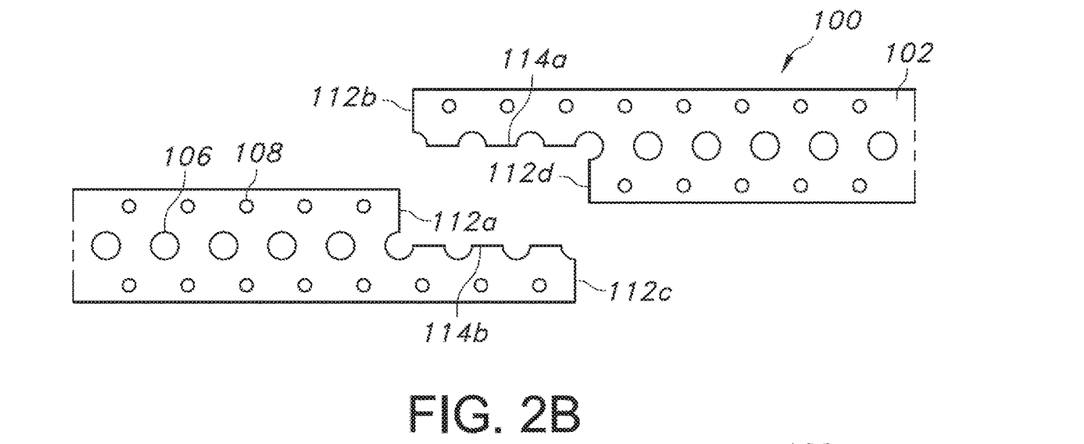
FIG. 2B depicts an alternative transverse cut made in a length of rivet tape to practice a method for mending rivet tape according to the present disclosure.
Figure 2C:
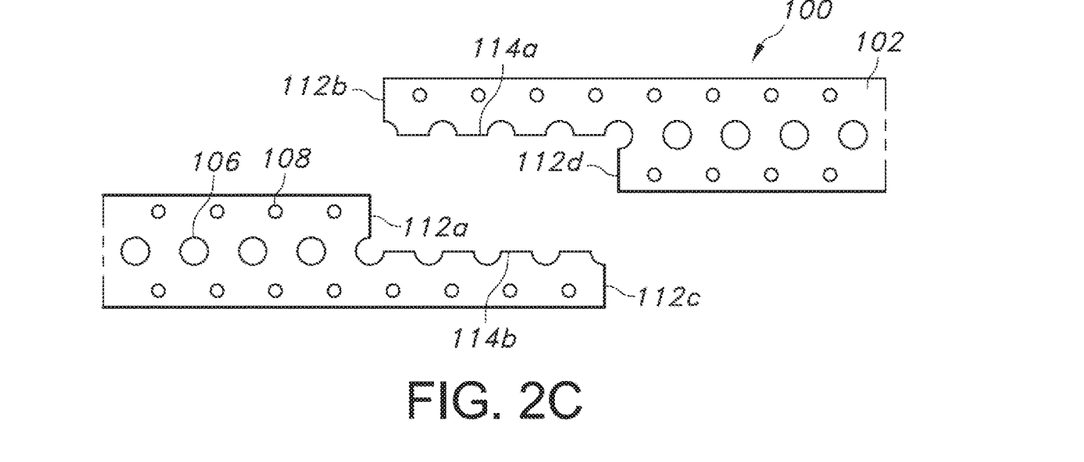
FIG. 2C depicts another alternative transverse cut made in a length of rivet tape to practice a method for mending rivet tape according to the present disclosure.
Figure 2D:
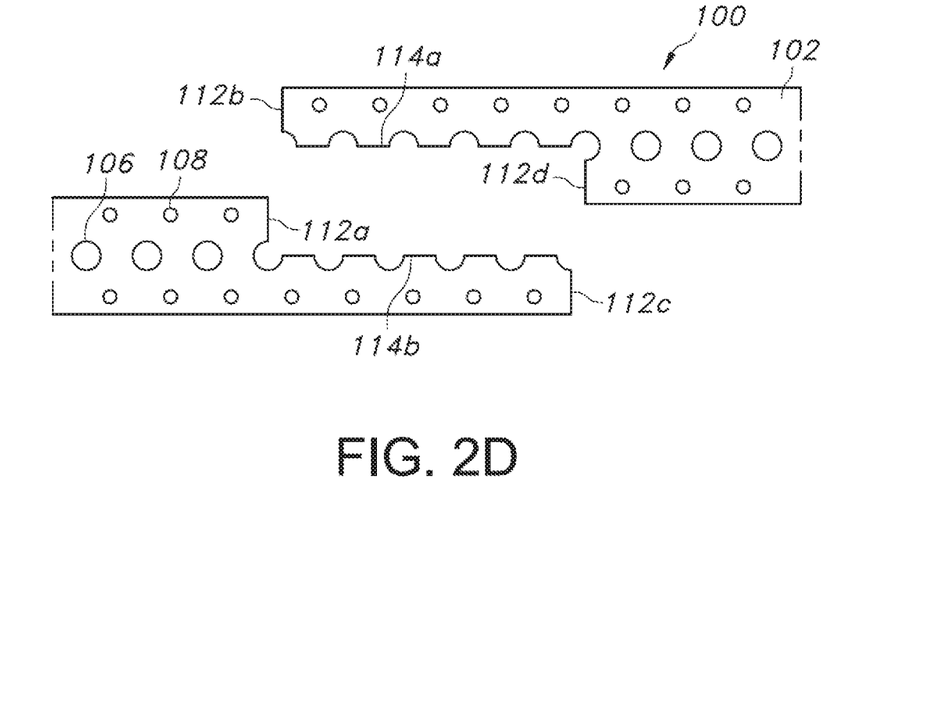
FIG. 2D depicts another alternative transverse cut made in a length of rivet tape to practice a method for mending rivet tape according to the present disclosure.
Figure 2E:
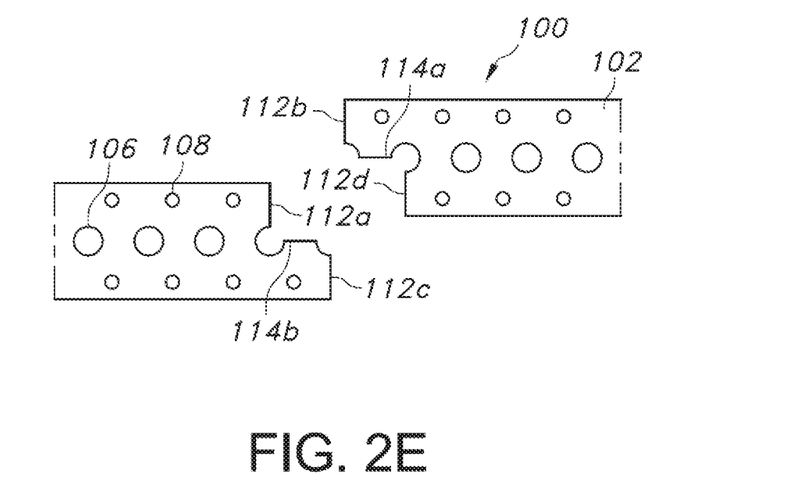
FIG. 2E depicts another alternative transverse cut made in a length of rivet tape to practice a method for mending rivet tape according to the present disclosure.

FIGS. 1A-B show lengths of rivet tape 100 as it is known in the art. The rivet tape 100 includes an elongated body 102 including a plurality of spaced-apart rivets 104 retained within rivet apertures 106, disposed in a substantially linear orientation down a center line of the rivet tape elongated body 102. Near the opposed edges of the elongated body 102, a plurality of gear indexer apertures 108 are provided. These gear indexer apertures 108 are engage by cooperating gears of a riveting machine (not shown), whereby the rivet tape 100 is advanced through the riveting machine during a riveting operation. Typically, such rivet tape 100 is provided for use in a large roll carrying many rivets, conveniently automating or semi-automating the riveting process.

As shown, the rivet tape 100 includes cuts or breaks 110 in the body 102. While seemingly minor, these cuts or breaks 110 are sufficient to disrupt the integrity of the rivet tape 100 during a riveting operation, due to the tensioning forces imposed by a riveting machine. Moreover, the cuts or breaks 110 risk interfering with proper feeding of the rivet tape 100 through the riveting machine gearing which advances the rivet tape forwardly during use.

To solve this and other problems, it has been surprisingly discovered that a relatively simple process can be employed to provide a strong repair joint for mending a rivet tape length 100 as described above. At a high level, the process includes cutting portions of the rivet tape on each side of a break or cut to provide aligned coplanar edges, abutting the aligned coplanar edges to one another to define a substantially continuous rivet tape seam, and joining the aligned coplanar edges to one another.

In more detail, with reference to FIGS. 2A-E, the process includes a step of removing rivets 104 from the rivet tape 100 at either side of a break 110. In embodiments, 3, 4, 5, and 6 rivets 104 were removed to expose the corresponding rivet apertures 106 (see FIGS. 2A-2D). It was found that removing rivets 104 as described reduced the tendency of the joint formed as described below to twist or separate when the repaired rivet tape 100 was fed through a riveting machine mechanism.

Next, a series of cuts were made in the elongated body 102 of the rivet tape to define parallel and perpendicular aligned coplanar edges. In the depicted embodiment as shown, a series of cuts were made to define parallel aligned coplanar edges 112a, 112b, 112c, 112d and also perpendicular aligned coplanar edges 114a, 114b, whereby the aligned coplanar edges when joined define a substantially Z-shaped seam as will be described. In various embodiments, the perpendicular aligned coplanar edges 114a, 114b span 2, 3, 4, 5, and 6 rivet apertures 106.

Figure 3:
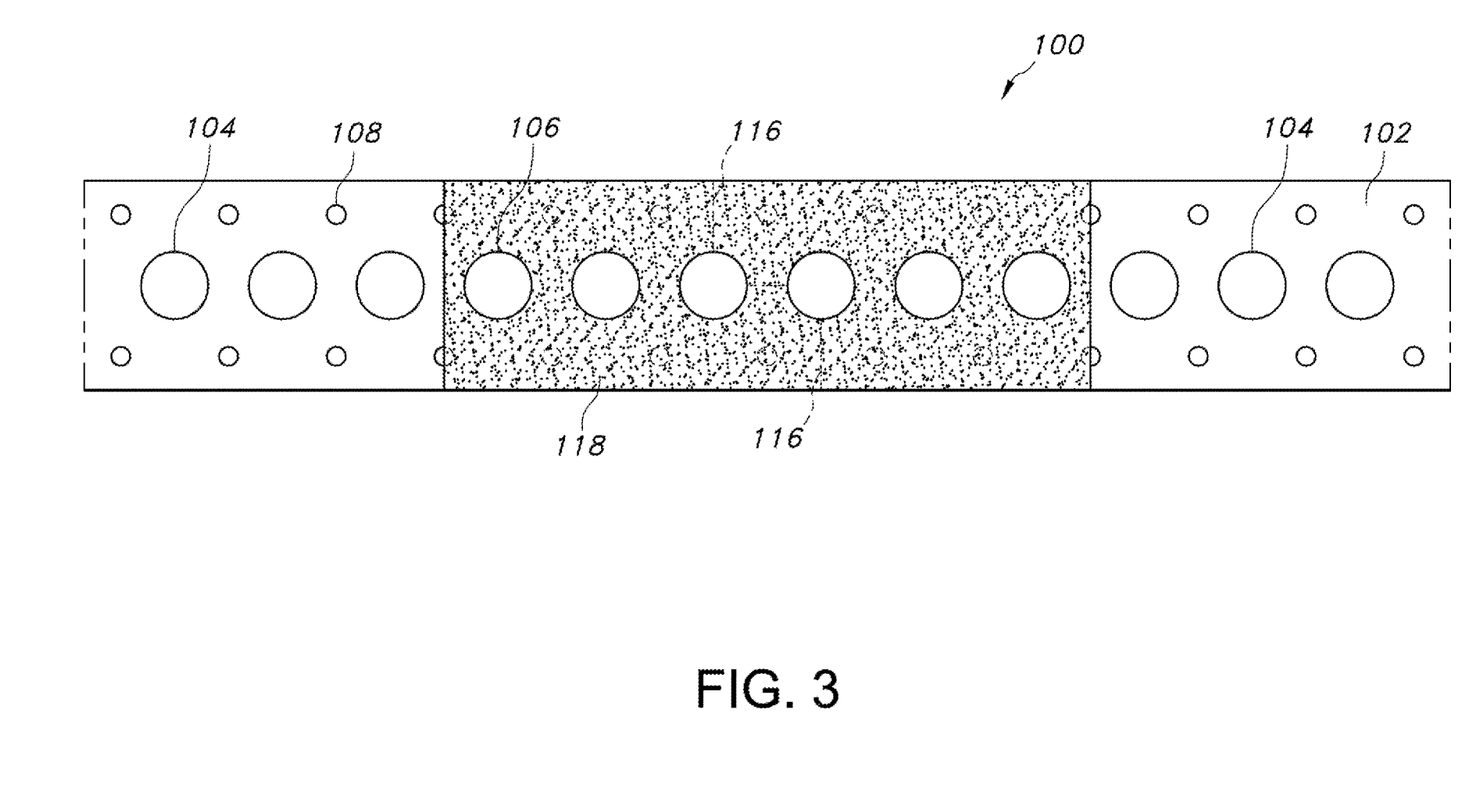
FIG. 3 depicts a length of rivet tape mended according to the method of the present disclosure.

Next, as shown in FIG. 3 the parallel and perpendicular aligned coplanar edges 112a, 112b, 112c, 112d, 114a, and 114b are abutted, defining a substantially Z-shaped seam 116. An adhesive strip 118 is then overlaid to cover the seam 116 and the exposed rivet apertures 106. Optionally, to provide an even stronger bond the adhesive strip 118 may be dimensioned to also cover the gear indexer apertures 108 disposed adjacent to the exposed rivet apertures 106, as it was found that the adhesive strip 118 did not interfere with the meshing of the riveting machine indexing gears with the indexing gear apertures. Optionally, an adhesive strip 118 may be placed on each opposed side of the rivet tape body 102, thus strengthening the bond.

Figure 4A:
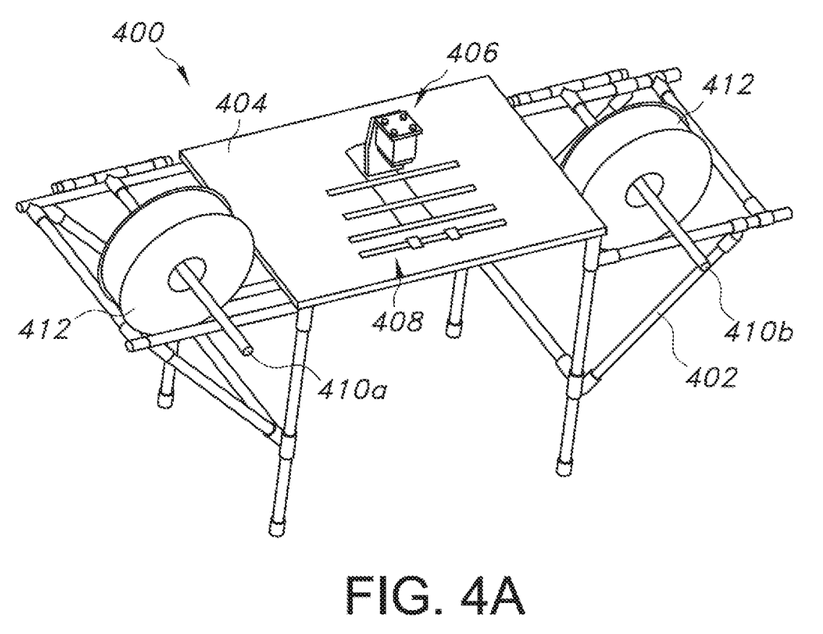
FIG. 4A shows a rivet tape mending workstation according to the present disclosure.

In another aspect, devices are provided for practicing the above-described method. With reference to FIG. 4A, in an embodiment a workstation 400 includes a frame 402, a worksurface 404, a cutting station 406, and a taping station 408. The frame 402 includes rods 410a, 410b configured for slidingly holding a pair of rivet tape spools 412 on opposed sides of the frame.

The cutting station 406 (see FIG. 4B) includes a base 414 configured to be secured to worksurface 404 by a plurality of fasteners 416. A sliding rivet holder 418 is provided, configured to be slidingly translated along a track 420. This can be done manually or mechanically, such as by hydraulics, linear actuators, gearsets, combinations thereof, or any other suitable means for slidingly translating the rivet tape holder 418 forwardly and backwardly. The rivet tape holder 418 further includes a slot 422 dimensioned to receive segments of rivet tape 100 (not shown in this view), and a plurality of pins 424 dimensioned for engaging rivet apertures 106.

Figure 4B:
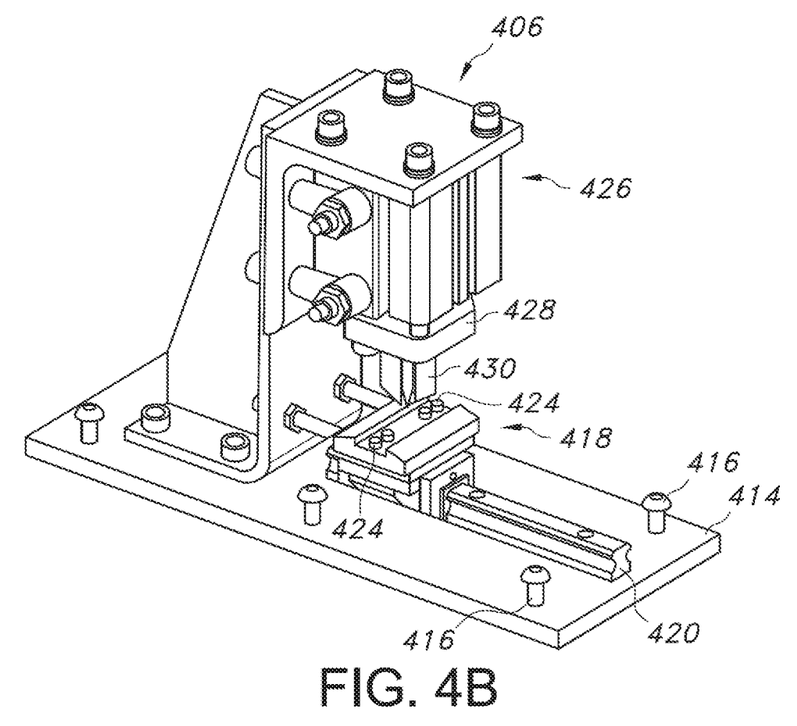
FIG. 4B shows a cutter assembly for use in the workstation of FIG. 4A.

The cutting station 406 further includes a cutter 426 comprising a blade holder 428 holding one or more cutting blades 430. The cutting blades 430 are configured to provide cuts in a segment of rivet tape 100 defining the parallel and perpendicular aligned coplanar edges 112a, 112b, 112c, 112d, 114a, and 114b described above. As will be appreciated, this may be accomplished by a single suitably configured blade 430, or by a plurality of cutting blades 430 arranged in the desired configuration to provide the desired cut shape.

The blade holder 428 is configured to advance the cutting blades 430 upwardly and downwardly (see arrow) to make the required cuts in a segment or segments of rivet tape 100 held in the rivet tape holder 418. This can be done manually or mechanically, such as by hydraulics, linear actuators, gearsets, combinations thereof, or any other suitable means for slidingly translating the blade holder 428 upwardly and downwardly a sufficient distance to make the desired cuts in a rivet tape section and to then retract the blade holder. A shield (not shown for convenience) may be included to prevent inadvertent contact of an operator's fingers with cutting blades 430.

Figure 4C:
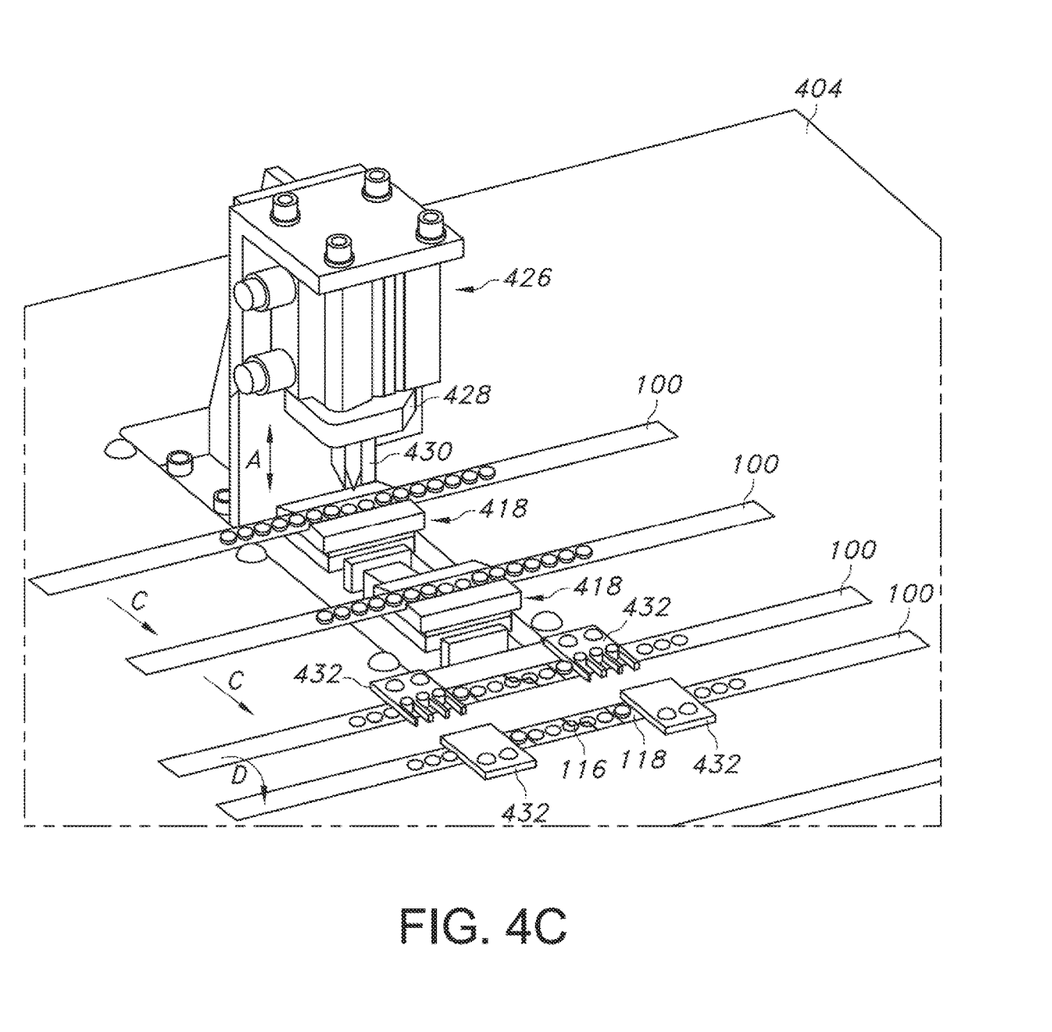
FIG. 4C shows the cutter assembly of FIG. 4B and a taping workstation used in the workstation of FIG. 4A, in use in repairing a section of rivet tape.

With reference to FIG. 4C, in use a section of rivet tape 100 is placed in the rivet tape holder slot 422 whereby the pins 424 engage the rivet tape apertures 106, and the rivet tape holder 418 is slidingly translated to a position below the cutting blades 420 (see arrow B) dimensioned to receive segments of rivet tape 100 (not shown in this view), and a plurality of pins 424. The holder 418 is slidingly translated downwardly, and a cut is made defining aligned coplanar edges as described above in adjoining segments of the rivet tape 100.

Next, the holder 418 is slidingly translated away from the cutter 426 (arrows C) and the rivet tape 100 segments are transferred to the taping station 408. The rivet tape segments are abutted to form the seam 116 described above, and retained in place using clamps 432. As described above, a first adhesive strip 118 is placed over the seam 116 on a first surface of the rivet tape 100 segments, the segments are inverted (arrow D), and a second adhesive strip 118 is placed on the opposed surface of the rivet tape segments. The repaired rivet tape 100 may then be transferred to a spool for subsequent use, or combined with other rivet tape 100 sections (repaired as described above) to make a full roll or spool for subsequent use. A suitable counter (not shown) may be included to count rivets 104 to ensure that the full roll or spool includes the required number of rivets.

Accordingly, by the foregoing description methods and devices for mending a rivet tape length are provided. Advantageously, the described methods and devices provide a mended rivet tape portion which does not separate at a seam or create a raised portion when fed through a riveting machine mechanism, each of which would interfere with proper operation of a riveting machine. Further, the bond joining adjacent rivet tape edges is significantly stronger than any tensioning stress imposed by the riveting machine. Still more, removal of rivets from portions of the rivet tape adjacent to the seam of the mended portion significantly reduced the tendency of the joint to twist while being passed through the riveting machine. By the described methods and devices, multiple broken lengths of rivet tape may be joined one to another to provide a full or partial roll of tape, thus significantly reducing waste and attendant cost incurred by discarding otherwise unusable lengths of rivet tape.

Obvious modifications and variations are possible in light of the above teachings. All such modifications and variations are within the scope of the appended claims when interpreted in accordance with the breadth to which they are fairly, legally and equitably entitled.

What is claimed:

1. A rivet tape repair workstation, comprising:
   a cutting station comprising a rivet tape holder and a cutter comprising one or more cutting blades configured to cut a rivet tape length whereby at least three aligned coplanar rivet tape edges are defined; and
   a taping station comprising a plurality of clamps for holding adjoining rivet tape lengths in an abutted relationship wherein the rivet tape holder is configured for sliding translation along a track.

2. The workstation of claim 1, wherein the rivet tape holder comprises a slot dimensioned for receiving and holding a length of rivet tape therein.

3. The workstation of claim 2, wherein the rivet tape holder comprises one or more pins dimensioned for engaging corresponding rivet apertures defined in the length of rivet tape.

4. The workstation of claim 1, wherein the cutter comprises a blade holder configured for slidingly translating the one or more cutting blades upwardly and downwardly.

5. The workstation of claim 1, further including a pair of rods configured for slidingly holding a pair of spools on opposed sides of the workstation.

6. A rivet tape repair workstation, comprising:
   a cutting station comprising a rivet tape holder and a cutter comprising one or more cutting blades configured to cut a rivet tape whereby at least three aligned coplanar rivet tape edges are defined and three to six rivets held in a section of rivet tape having a break requiring repair are removed; and
   a taping station comprising a plurality of clamps for holding adjoining rivet tape lengths in an abutted relationship wherein the rivet tape holder comprises a slot dimensioned for receiving and holding a length of rivet tape therein.

7. The workstation of claim 6, wherein the rivet tape holder is configured for sliding translation along a track.

8. The workstation of claim 6, wherein the rivet tape holder comprises one or more pins dimensioned for engaging corresponding rivet apertures defined in the length of rivet tape.

9. The workstation of claim 6, wherein the cutter comprises a blade holder configured for slidingly translating the one or more cutting blades upwardly and downwardly.

10. The workstation of claim 6, further including a pair of rods configured for slidingly holding a pair of spools on opposed sides of the workstation.

11. A rivet tape repair workstation, comprising:
    a cutting station comprising a rivet tape holder and a cutter comprising one or more cutting blades configured to cut a rivet tape whereby at least three aligned coplanar rivet tape edges are provided and three to six rivets held in a section of rivet tape having a break requiring repair are removed; and
    a taping station comprising a plurality of clamps for holding adjoining rivet tape lengths in an abutted relationship defining a substantially continuous seam; and
    a pair of rods configured for slidingly holding a pair of spools on opposed sides of the workstation.

12. The workstation of claim 11, wherein the rivet tape holder is configured for sliding translation along a track.

13. The workstation of claim 11, wherein the substantially continuous seam defines a Z shape.

14. The workstation of claim 11, wherein the rivet tape holder comprises a slot dimensioned for receiving and holding a length of rivet tape therein.

15. The workstation of claim 14, wherein the rivet tape holder further comprises one or more pins dimensioned for engaging corresponding rivet apertures defined in the length of rivet tape.

16. The workstation of claim 11, wherein the cutter comprises a blade holder configured for slidingly translating the one or more cutting blades upwardly and downwardly.

* * * * *